United States Patent Office 2,925,438
Patented Feb. 16, 1960

2,925,438

METHOD OF CONVERTING UNSATURATED ORGANIC COMPOUNDS TO ORGANOBORON COMPOUNDS

Herbert C. Brown, West Lafayette, Ind.

No Drawing. Application February 1, 1957
Serial No. 637,615

24 Claims. (Cl. 260—606.5)

This invention relates to the preparation of organoboron compounds and more particularly to the preparation of organoboron compounds having the formula $R_3B$ in which R is a saturated hydrocarbon radical, such as an alkyl radical.

Meerwein, Hinz, Majert and Sonke (J. Prakt. Chem., 147, 240 (1936)) have described the synthesis of trialkylborons. Thus, triethylboron has been prepared by the reaction of ethylmagnesium bromide on boron trifluoride in diethyl ether as solvent. The reaction is illustrated by the equations:

$$C_2H_5Br + Mg \rightarrow C_2H_5MgBr$$
$$3C_2H_5MgBr + BF_3 \rightarrow (C_2H_5)_3B + 3MgFBr$$

This procedure has disadvantages since it requires a number of intermediates, such as ethyl bromide, magnesium and boron trifluoride, and involves the formation of a by-product, such as MgBrF, which must be recovered for the economic production of trialkylborons.

Hurd (Jorn. Am. Chem. Soc., 70, 2053 (1948)) has reported that gaseous diborane may be reacted with a large excess of olefinic hydrocarbons in sealed tubes at 100° C. for extended periods of time. Thus, a mixture of triisobutylboron and tri-t-butylboron was obtained by the reaction of isobutylene and diborane in a sealed tube at 100° C. for 24 hours. Reaction of ethylene with diborane at 100° C. for 96 hours produced triethylboron.

R. S. Brokaw and R. N. Pease (Journ. Am. Chem. Soc., 72, 3237 (1950); ibid., 72, 5263 (1950)) have reported that gaseous olefins, such as ethylene, propylene and 1-butene, react with aluminum borohydride at elevated temperatures to form trialkylborons along with mixed alkyl-aluminum hydrides. Thus, the reaction of ethylene with aluminum borohydride at 140° C. is postulated to be $$Al(BH_4)_3 + 4C_2H_4 \rightarrow (C_2H_5)_3B + C_2H_5Al(BH_4)_2$$
$$C_2H_5Al(BH_4)_2 + 7C_2H_4 \rightarrow 2(C_2H_5)_3B + \tfrac{1}{2}(C_2H_5)_4Al_2H_2$$

The last two of the above mentioned methods offer some advantages over the Grignard route in that they utilize olefins instead of the more expensive alkyl halides. However, neither diborane nor aluminum borohydride are commercially available materials at the present time. Moreover, the characteristics of these materials are such that they are difficult to handle. Thus, diborane is a gas, rapidly hydrolyzed by moisture, and very sensitive to air oxidation. Aluminum borohydride is also sensitive to water and reacts with explosive violence with air.

There would be obvious advantages to the utilization of the alkali metal borohydrides for the synthesis of organoborons. The alkali metal borohydrides are now commercially available and exhibit remarkable stability to air and water. However, it is well known that olefins do not react with the alkali metal borohydrides. Thus, sodium borohydride is widely used for the selective reduction of the carbonyl groups in unsaturated aldehydes and ketones. No reaction has been observed in heating olefins with the alkali metal borohydrides at temperatures as high as 200° C.

In my copending application Serial No. 619,355, filed October 30, 1956, I have described the preparation of organoboron compounds by reacting an unsaturated organic compound having one or more olefinic double bonds or an acetylenic triple bond, such as 1-butene, butadiene and 3-hexyne, with a reagent consisting of an alkali metal borohydride and a halide of a polyvalent metal, such as aluminum chloride, titanium tetrachloride, etc., in an inert liquid carrier, such as a solvent for the alkali metal borohydride. This reagent did not include halides of metalloids, such as boron halides. The addition of a stoichiometric quantity of a boron halide to a solution of an alkali metal borohydride results in a rapid and essentially complete loss of the active hydrogen of the solution and, consequently, it might be expected that such a reagent would be unsatisfactory.

I have discovered that under certain conditions a reagent consisting of a boron halide and an alkali metal borohydride is exceedingly effective and efficient for the preparation of organoboron compounds by reaction with an unsaturated organic compound. Thus, by slowly adding a boron halide to a solution of an alkali metal borohydride containing the unsaturated organic compound, it is possible to realize a 90 to 100 percent utilization of the hydride content of the alkali metal borohydride in the hydroboration of unsaturated compounds.

The use of a boron halide for this purpose has the advantage of increasing the possible yields. In utilizing a metal halide, such as aluminum chloride, to bring about the hydroboration of olefins and other unsaturated compounds, only 75 percent of the available hydride of the alkali metal borohydride can be utilized. On the other hand, the use of boron halides permits 100 percent of the available hydride of the borohydride to be utilized. This is illustrated by the following equations where R represents a saturated hydrocarbon radical:

$$9RCH=CH_2 + 3NaBH_4 + AlCl_3 \rightarrow 3(RCH_2CH_2)_3B + AlH_3 + 3NaCl$$
$$12RCH=CH_2 + 3NaBH_4 + BCl_3 \rightarrow 4(RCH_2CH_2)_3B + 3NaCl$$
$$12RCH=CH_2 + 3NaBH_4 + 4BF_3 \rightarrow 4(RCH_2CH_2)_3B + 3NaBF_4$$

In its broad aspect the method of the invention comprises slowly associating in an inert liquid carrier one component of a reagent consisting of an alkali metal borohydride and a boron halide with the other component of the reagent in the presence of an amount of an unsaturated organic compound corresponding stoichiometrically at least to the amount of said one component of the reagent. Thus, a mixture of a boron halide and an unsaturated organic compound in stoichiometric proportions may be added slowly at a rate comparable to the rate of the hydroboration reaction to a solution or slurry of the alkali metal borohydride. Preferably, however, the boron halide is added slowly to a solution or slurry of the alkali metal borohydride containing about four moles of the unsaturated organic compound per mole of the alkali metal borohydride. The reaction proceeds smoothly at room temperature. However, temperature is not a critical factor since the reaction appears to proceed equally well at temperatures of 0° C. or 50° C.

While in the practice of the present invention it is preferred to employ a solvent for the alkali metal borohydride as the inert liquid carrier, other inert liquid carriers may be used. Usually, however, when the liquid carrier is not a solvent for the alkali metal borohydride, more satisfactory results are obtained if a solvent, preferably in an amount sufficient to solubilize the alkali metal borohydride, is used in conjunction with the non-solvent liquid carrier. It is preferable that the alkali metal borohydride be dissolved in a suitable inert solvent, such as diethyl ether or tetrahydrofuran for lithium borohydride and the dimethylether of diethylene glycol or the dimethylether or triethylene glycol for sodium borohydride. Satisfactory results may be obtained using slurries of the alkali metal borohydride, such as a slurry of lithium borohydride in a mixture of tertrahydrofuran and toluene or a slurry of sodium borohydride in a mixture of tetrahydrofuran and dimethylether of diethylene glycol. Potassium borohydride also may be used but is somewhat less desirable than sodium or lithium borohydrides because of its lower solubility in desirable solvents.

Boron trifluoride is readily used in the reaction over a wide temperature range. Boron trichloride also is highly effective. However, since boron trichloride exhibits some tendency to split tetrahydrofuran and the dimethylethers of di- and triethylene glycol, it is preferably used in these solvents at a temperature of 25° C. or lower. It is quite stable in diethyl ether and can be freely used in this solvent. Boron tribromide is also effective but it is more costly than other boron halides and exhibits a tendency to split the ethers. Boron triiodide can be used but is difficult to handle and tends to react with the solvents.

The term "unsaturated" as used herein is intended to refer to organic compounds which owe their unsaturation to the presence of one or more carbon to carbon double bonds or carbon to carbon triple bonds. In the sense in which this term is used herein, aromatic rings, such as benzene and toluene, and alicyclic rings, such as cyclohexane, are not unsaturated and may be present in the unsaturated organic compound as inert substituents.

The method of the present invention is applicable broadly for conversion to organoboron compounds of olefins such as 1-pentene, 1-octene and styrene, dienes such as butadiene and cyclohexadiene, and acetylenes such as 1-hexyne and 2-hexyne. It also is applicable for the conversion of substituted olefins, such as methylmethacrylate, triallyl borate, m-nitrostyrene, nitroethylene, allylethylether and vinylbutyl ether. Thus, certain functional groups, such as nitro-, carbethoxy, and ether groups can be accommodated. Other groups, such as aldehyde and keto groups are reduced so that the hydroboration is accompanied by reduction of these functional groups.

More especially, the invention contemplates the conversion of olefins, such as 1-pentene, 2-pentene, 1-hexene, 1-octene, diisobutylene, cyclopentene, cyclohexene, styrene, α-methylstyrene and β,β-diphenylethylene, to organoboron compounds having the formula $R_3B$ in which R represents a saturated hydrocarbon radical.

The process of the invention is remarkably simple. For example, a solution of 3 moles of sodium borohydride and 12 moles of the organic reactant in 2 liters of dimethylether of diethylene glycol is maintained at 25° to 40° C. under a nitrogen atmosphere in a stirred 5-liter flask. Pure boron trifluoride, 4 moles, is passed in over a period of one hour, the temperature being maintained at 25° to 40° C. through external cooling. Water then is added. The organoboron layer is separated in a nitrogen atmosphere, washed with several portions of water and then distilled under vacuum to isolate the pure trialkylboron. The yields are exceedingly good as illustrated by the following table.

| Olefin | Amount in Moles of Olefin | Amount in Moles of Organoboron | Yield in Percent |
| --- | --- | --- | --- |
| Cyclohexene | 10.9 | 3.34 | 90 |
| Cyclopentene | 10.6 | 3.31 | 93 |
| 2,4,4-Trimethyl-1-pentene | 9.5 | 2.70 | 85 |
| 2,4,4-Trimethyl-2-pentene | 9.7 | 2.82 | 87 |
| 1-Octene | 12.0 | 3.40 | 85 |
| Styrene | 6.0 | 1.80 | 90 |
| α-Methylstyrene | 10.9 | 3.40 | 90 |

The invention is illustrated further by the following examples.

*Boron trifluoride and sodium borohydride*

In a dry 5-liter round-bottomed flask equipped with a mercury sealed stirrer, condenser, inlet tube and thermometer was placed 2 liters of purified dimethylether of diethylene glycol, 114 grams (3.0 moles) of sodium borohydride and 840 grams (12.0 moles) of 1-pentene. A nitrogen atmosphere was maintained. Boron trifluoride, 4 moles, was passed into the reaction mixture over a period of one hour with vigorous cooling to maintain the temperature within the flask at 35°–40° C. At the end of the reaction water was added to dissolve the solvent. The aqueous layer was removed. The product layer was washed several times further with water in a nitrogen atmosphere and the product was then distilled under reduced pressure. There was obtained 805 grams of tri-n-pentylboron, B.P. 94°–95° C. at 2 mm., a yield of 90 percent.

Identical procedures were used for the reaction of 1-hexene, 1-octene, 1-diisobutylene, 2-diisobutylene, cyclopentene, cyclohexene, styrene, α-methylstyrene and β,β-diphenylethylene. In all cases, 80–90 percent yields of the trialkylboron were realized.

The same procedure was used on a scale of 0.1 mole for diallyl (1,5-hexadiene), 3-hexyne, methylmethacrylate, triallylborate, m-nitrostyrene, nitroethylene, allylethyl ether and vinyl butyl ether. In these reactions the reaction product was taken up in ether, washed with water and the formation of organoboron derivative established by analysis after oxidation by alkaline hydrogen peroxide.

*Boron trifluoride and lithium borohydride*

In a 1-liter flask was placed 400 cc. of anhydrous diethyl ether, 5.5 grams of lithium borohydride and 82 grams (1.0 mole) of cyclohexene. A nitrogen atmosphere was maintained and 0.34 mole of freshly distilled boron trifluoride-ethyl etherate was slowly added through a dropping funnel over a period of one hour. Water was added and the ether layer was separated, dried and distilled. The ether was removed on the steam bath and the product then distilled under reduced pressure (nitrogen atmosphere). There was obtained an 84 percent yield of tricyclohexyl boron, B.P. 130°–132° C. at 2 mm.

Similar procedures were use for butadiene, styrene, 1-octene and vinylbutyl ether.

*Boron trichloride and sodium borohydride*

In a 1-liter flask was placed 400 cc. of purified dimethylether of diethylene glycol, 9.5 grams of sodium borohydride and 82 grams (1.0 mole) of cyclohexene. A nitrogen atmosphere was maintained and 0.34 mole of boron trichloride dissolved in diethyl ether was slowly added through a dropping funnel over a period of one hour. The temperature was maintained below 25° C. The reaction mixture was treated with 200 ml. of diethyl ether, treated with water and the ether layer transferred to a distillation flask under nitrogen for distillation. There was obtained an 88 percent yield of tricyclohexylboron, B.P. 130°–132° C. at 2 mm.

This procedure also was applied for the reaction of 2-pentene, styrene, allyl chloride and p-carbethoxystyrene.

The claims of the present application are directed specifically to the preparation of an organoboron compound by reacting an unsaturated organic compound with a reagent consisting of an alkali metal borohydride and a boron halide. The claims of my copending application Serial No. 641,272, filed February 20, 1957, are directed broadly to the reduction of a chemical compound having a reducible functional group with a reagent consisting of an alkali metal borohydride and a boron halide.

I claim:

1. In a method of preparing an organoboron compound by reacting an unsaturated organic compound with a reagent consisting of an alkali metal borohydride and a boron halide, the step which comprises slowly bringing one component of said reagent in reactive contact in an inert liquid carrier with the other component of the reagent in the presence of an amount of the unsaturated organic compound corresponding stoichiometrically at least to the amount of said one component until substantially stoichiometric amounts of said organic compound and said alkali metal borohydride and said boron halide have reacted to form said organoboron compound, said unsaturated organic compound being selected from the group consisting of olefins, cycloolefins, dienes, alkynes, arylalkenes, alkyl alkenoates, haloalkenes, carbalkoxyaryl alkenes, alkenyl ethers, nitroalkenes, nitroarylalkenes and alkenyl borates.

2. The method as claimed by claim 1 wherein a mixture of a boron halide and the selected unsaturated organic compound in said stoichiometric proportions is added slowly to an alkali metal borohydride in an inert liquid carrier until a substantially stoichiometric amount of said borohydride has reacted with said mixture to form said organoboron compound.

3. The method as claimed by claim 1 wherein a boron halide is slowly added to a mixture of the selected unsaturated organic compound and an alkali metal borohydride in said stoichiometric proportions in an inert liquid carrier until a substantially stoichiometric amount of said boron halide has reacted with said mixture to form said organoboron compound.

4. The method claimed by claim 3 wherein the liquid carrier includes an inert solvent for the alkali metal borohydride.

5. The method claimed by claim 4 wherein the amount of solvent is sufficient to solubilize the borohydride.

6. The method claimed by claim 5 wherein the boron halide is selected from the group consisting of boron trifluoride and boron trichloride.

7. The method claimed by claim 6 wherein the alkali metal borohydride is sodium borohydride.

8. The method claimed by claim 6 wherein the alkali metal borohydride is lithium borohydride.

9. The method claimed by claim 7 wherein the solvent is the dimethylether of diethylene glycol.

10. The method claimed by claim 7 wherein the solvent is the dimethylether of triethylene glycol.

11. The method claimed by claim 8 wherein the solvent is diethyl ether.

12. The method claimed by claim 8 wherein the solvent is tetrahydrofuran.

13. In a method of preparing an organoboron compound by reacting an olefin with a reagent consisting of an alkali metal borohydride and a boron halide, the step which comprises slowly bringing one component of said reagent in reactive contact in an inert liquid carrier with the other component of the reagent in the presence of an amount of the olefin corresponding stoichiometrically at least to the amount of said one component until substantially stoichiometric amounts of said olefin and said alkali metal borohydride and said boron halide have reacted to form said organoboron compound.

14. The method as claimed by claim 13 wherein a mixture of a boron halide and an olefin in said stoichiometric proportions is added slowly to an alkali metal borohydride in an inert liquid carrier until a substantially stoichiometric amount of said borohydride has reacted with said mixture to form said organoboron compound.

15. The method as claimed by claim 13 wherein a boron halide is slowly added to a mixture of an olefin and an alkali metal borohydride in said stoichiometric proportions in an inert liquid carrier, until a substantially stoichiometric amount of said boron halide has reacted with said mixture to form said organoboron compound.

16. The method claimed by claim 15 wherein the liquid carrier includes an inert solvent for the alkali metal borohydride.

17. The method claimed by claim 16 wherein the amount of solvent is sufficient to solubilize the borohydride.

18. The method claimed by claim 17 wherein the boron halide is selected from the group consisting of boron trifluoride and borontrichloride.

19. The method claimed by claim 18 wherein the alkali metal borohydride is sodium borohydride.

20. The method claimed by claim 18 wherein the alkali metal borohydride is lithium borohydride.

21. The method claimed by claim 19 wherein the solvent is the dimethylether of diethylene glycol.

22. The method claimed by claim 19 wherein the solvent is the dimethylether of triethylene glycol.

23. The method claimed by claim 20 wherein the solvent is diethyl ether.

24. The method claimed by claim 20 wherein the solvent is tetrahydrofuran.

No references cited.